(12) United States Patent
Snider

(10) Patent No.: US 7,444,495 B1
(45) Date of Patent: Oct. 28, 2008

(54) PROCESSOR AND PROGRAMMABLE LOGIC COMPUTING ARRANGEMENT

(75) Inventor: Gregory S. Snider, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1095 days.

(21) Appl. No.: 10/232,970

(22) Filed: Aug. 30, 2002

(51) Int. Cl.
*G06F 9/455* (2006.01)
*G06F 15/163* (2006.01)

(52) U.S. Cl. ......................................... 712/18; 712/227
(58) Field of Classification Search ................. 712/209, 712/213, 227, 18; 703/26; 717/134, 139, 717/140, 147, 148; 716/16
See application file for complete search history.

(56) References Cited

U.S. PATENT DOCUMENTS

| | | | | |
|---|---|---|---|---|
| 5,594,917 A * | 1/1997 | Palermo et al. | ............... | 712/34 |
| 5,751,982 A * | 5/1998 | Morley | ........................ | 712/209 |
| 5,768,593 A * | 6/1998 | Walters et al. | .............. | 717/141 |
| 5,933,642 A * | 8/1999 | Greenbaum et al. | ......... | 717/140 |
| 6,021,275 A * | 2/2000 | Horwat | ........................ | 717/159 |
| 6,282,706 B1 * | 8/2001 | Chauvel et al. | ............. | 717/150 |
| 6,397,379 B1 * | 5/2002 | Yates et al. | .................. | 717/140 |
| 6,408,382 B1 * | 6/2002 | Pechanek et al. | ............ | 712/227 |
| 6,438,738 B1 * | 8/2002 | Elayda | ........................ | 716/16 |
| 6,584,601 B1 * | 6/2003 | Kodosky et al. | ................ | 716/4 |
| 6,772,413 B2 * | 8/2004 | Kuznetsov | ................... | 717/136 |
| 6,820,252 B2 * | 11/2004 | Sakamoto et al. | ........... | 717/136 |
| 6,981,167 B2 * | 12/2005 | Johnson et al. | ............. | 713/500 |

* cited by examiner

*Primary Examiner*—Daniel Pan

(57) ABSTRACT

A computing arrangement including a processor and programmable logic. In various embodiments, the arrangement includes an instruction processing circuit coupled to a programmable logic circuit, and a memory arrangement coupled to the instruction processing circuit and to the programmable logic circuit. The instruction processing circuit executes instructions of a native instruction set, and the programmable logic is configured to dynamically translate input instructions to translated instructions of the native instruction set. The translated instructions are stored in a translation cache in the memory arrangement, and the translation cache is managed by the programmable logic. The programmable logic then provides the translated instructions to the instruction processing circuit for execution.

17 Claims, 3 Drawing Sheets

PROCESSOR AND PROGRAMMABLE LOGIC COMPUTING ARRANGEMENT

FIELD OF THE INVENTION

The present invention generally relates to a computing arrangement having programmable logic that is configurable for different support functions.

BACKGROUND

In most computer processor architectures, sequences of machine instructions are read sequentially from memory and executed directly by the hardware. There are some architectures and applications, however, where the instruction stream requires further processing before execution by the hardware. In one example, an instruction stream such as Java byte codes is not compatible with the underlying hardware. In this instance, the Java byte codes are translated to instructions that are executable by the underlying hardware. Other examples include code optimization and software-based identification and extraction of instruction-level parallelism. These types of processes are generally categorized as performing dynamic translation. Dynamic translation generally introduces significant overhead.

In a Java virtual machine (JVM) equipped with a just-in-time (JIT) compiler, sequences of Java byte codes that are frequently emulated with an interpreter running on the host processor are candidates for translation into native machine code. When a candidate is selected for translation, the sequence of Java byte codes is translated by the JIT compiler and stored in a translation cache. The next time the same byte code sequence is encountered, the JVM checks the translation cache for the presence of the translation of the byte codes in the translation cache. If the translation is present, in the general scenario the translation is executed instead of interpreting the byte code sequence. Because the native machine code will execute faster than interpreted byte codes, a Java application will gradually run faster as the translation cache is filled with translations of byte code sequences. The overhead involved in this type of arrangement is introduced by interpretation of byte code sequences, compilation of byte code sequences, and management of the translation cache. Other applications involving dynamic translation also introduce significant overhead.

Not only are the processing capacities of some processors stretched by the overhead associated with dynamic translation, but the same processors are deployed in arrangements that host other applications that require significant computational resources. For example, the same processor called upon to perform dynamic translation for one application may be called upon by other applications to perform data decompression, encryption, decryption and an assortment of other tasks. In mobile computing arrangements, the further requirement of minimal power consumption may further add to the challenges of developing an apparatus that meets the various design objectives.

A system and method that address the aforementioned problems, as well as other related problems, are therefore desirable.

SUMMARY OF THE INVENTION

In various embodiments the present invention is a computing arrangement that includes an instruction processing circuit and programmable logic. The instruction processing circuit is coupled to the programmable logic circuit, and a memory arrangement is coupled to the instruction processing circuit and to the programmable logic circuit. The instruction processing circuit executes instructions of a native instruction set, and the programmable logic is configured to dynamically translate input instructions to translated instructions of the native instruction set. The translated instructions are stored in a translation cache in the memory arrangement, and the translation cache is managed by the programmable logic. The programmable logic then provides the translated instructions to the instruction processing circuit for execution.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention in various embodiments has programmable logic that is configured to dynamically translate sequences of instructions for execution by an instruction processing circuit. In another aspect, the programmable logic is also configured to concurrently manage a translation cache containing the translations of the code sequences. A further aspect of the invention has the programmable logic configurable in different modes of operation. One of the modes is the aforementioned dynamic translation and translation cache management mode. Other modes of operation are available for support of data processing performed by the instruction processing circuit.

Figure 1:
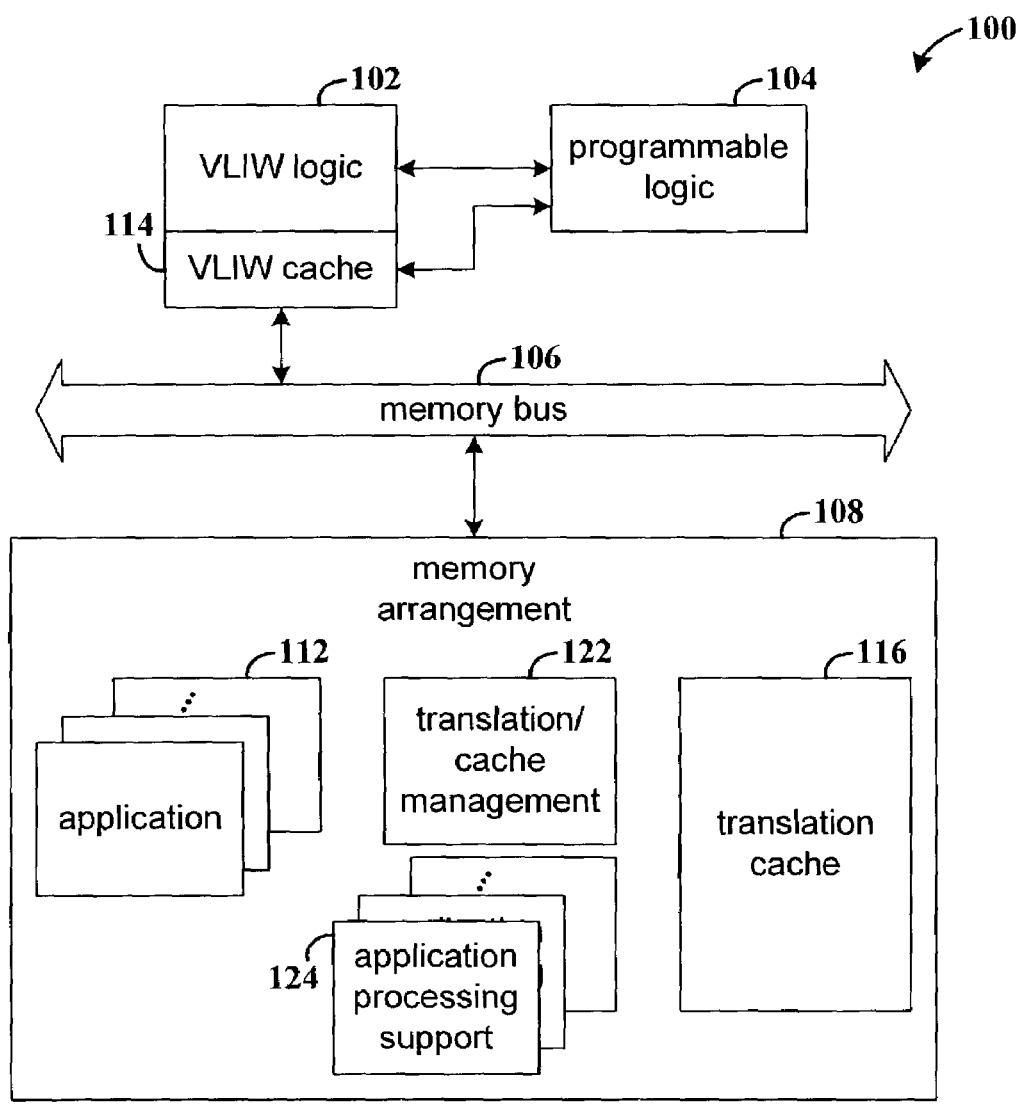
FIG. 1 is a block diagram of a computing arrangement in accordance with one embodiment of the invention.

FIG. 1 is a block diagram of a computing arrangement 100 in accordance with one embodiment of the invention. The computing arrangement includes circuitry that implements very long instruction word (VLIW) logic 102, programmable logic 104, memory bus 106, and memory arrangement 108. VLIW logic 102 is the logic that executes instructions of a native instruction set. An example of VLIW logic executes instructions of the IA64 architecture. In an alternative embodiment, the invention uses instruction processing logic that processes instructions other than those of a very long instruction word, such as instructions of the x86 or a RISC-based instruction set. It will be appreciated that in an embodiment that processes an instruction set other than a VLIW instruction set, the VLIW logic 102 of the example embodiment would be replaced with instruction processing logic that is suitable for the target instruction set. The components and connections used to implement the memory arrangement will depend on the design requirements. For example, different embodiments will include different combinations of RAM and ROM, as well as different types of RAM and ROM.

One or more application programs 112 are available in the memory arrangement for execution by the VLIW logic. The functions provided by the application programs vary according to the intended use of the computing arrangement. For example, the applications may provide functions such as web browsing, emailing, information organizing or other special purpose functions. While not shown, it will be appreciated that an operating system (not shown) provides overall management of the resources of the computing arrangement 100.

VLIW cache 114 provides VLIW logic 102 with on-board caching of instructions from applications 112 and data used by the applications. In different example embodiments, the VLIW cache 114 includes a first-level cache or first- and second-level caches. The programmable logic 104 is also coupled to the VLIW cache so that both the VLIW logic and programmable logic have consistent views of the memory system. The VLIW cache includes both memory for storing cached instructions and data, as well as the control logic for maintaining the cache memory.

The programmable logic 104 provides processing support to the VLIW logic for selected functions. In one embodiment, the programmable logic is configurable to provide support for dynamic translation and translation cache management functions, and in addition supports other application processing. The operating system manages scheduling of applications 112. Management of the configuration data for the programmable logic is managed by low-level control software (not shown) executing in VLIW logic 102. That is, the control software determines when the programmable logic is to be configured for dynamic translation activities ("compatibility mode") versus being configured for application support ("acceleration mode"). The VLIW logic is adapted to support execution of instructions used in reconfiguring the programmable logic, as well as being adapted to receive one or more interrupt signals from the programmable logic.

Dynamic translation includes processing such as translating instructions of one instruction set to the native instruction set of the VLIW logic, optimizing an input instruction stream, and extracting instruction-level parallelism from an input instruction stream. The particular type of dynamic translation depends on the particular design requirements. For example, the translation/cache management may be applied to instruction streams such as Java byte codes (and other platform-independent code), and even translation of a native instruction set for one processor to the native instruction set of another processor such as performed by the Transmeta Crusoe processor.

The results of dynamic translation will be referred to as the "translation" or "translation set." The translation sets are stored in translation cache 116. The translation cache is also managed by the programmable logic, which removes this overhead from the VLIW logic. The translation cache is used for temporary storage of translation sets. Before translating a code sequence, the translation/cache management logic first checks whether a corresponding translation has already been created and stored in the translation cache. If so, the translation set from the translation cache is provided to the VLIW logic for execution. Otherwise, the code sequence is translated, and an area in the translation cache is selected for storage of the translation set.

The translation cache 116 is maintained within the memory arrangement 108. The translation cache, containing translation sets that are comprised of instruction sequences executable by the VLIW logic, is stored as part of the memory arrangement 108 in which the application code is also stored. Thus, the VLIW logic addresses instructions in the translation cache in the same manner as addressing application instructions. The particular cache management technique employed in managing the translation cache will vary with design requirements. For example, the translation cache can be managed using known least recently used (LRU) methods or using lesser known or new methods of cache management.

When the programmable logic is configured with application processing support logic, the programmable logic performs tasks other than dynamic translation in support of the functions provided by the applications 112. For example, the additional support functions include data encryption/decryption, data decompression, speech recognition, or image rendering.

The programmable logic 104 is configured with a selected configuration bitstream from memory arrangement 108 in accordance with the selected processing mode for the computing arrangement. When the computing arrangement is operating in a compatibility mode, the programmable logic is configured with the translation/cache management configuration bitstream 122. When the computing arrangement is operating in an acceleration mode, the programmable logic is configured with one of the application processing support configuration bitstreams 124. It will be appreciated that the particular one of the application processing support configuration bitstreams used to configure the programmable logic will vary the processing needs.

The particular type of programmable logic selected to implement the computing arrangement depends on the implementation requirements, for example, FPGAs or CPLDs. However, it will be appreciated that flexibility and speed in reconfiguring the programmable logic are desired attributes for switching between operating modes of the computing arrangement. In one embodiment, the programmable logic is integrated with the VLIW logic. In an alternative embodiment, the VLIW logic and programmable logic may be implemented in separate chips or devices.

Figure 2:
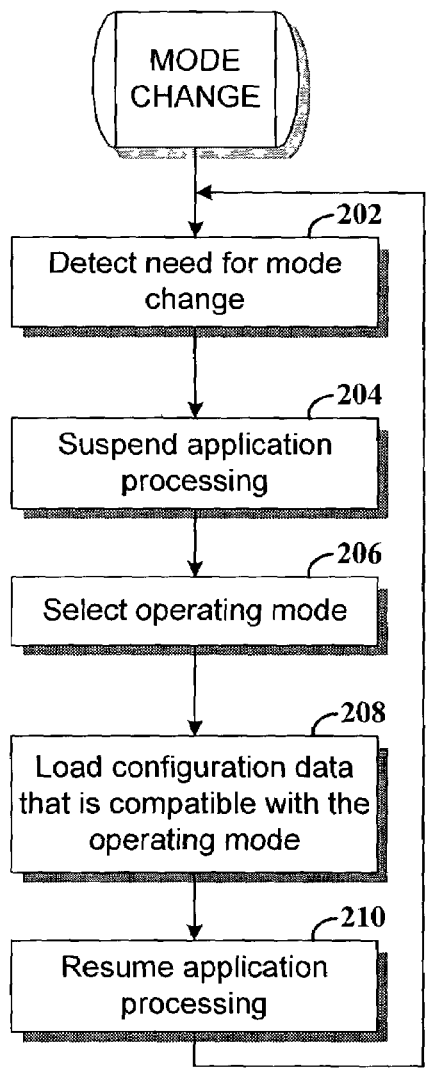
FIG. 2 is a flowchart of an example process that changes the mode of operation of the computing arrangement.

FIG. 2 is a flowchart of an example process that changes the mode of operation of the computing arrangement. In the example embodiment, the different modes of operation include the compatibility mode (translation and translation cache management) and the acceleration mode (application-specific support functions). In an example embodiment, control software determines when a mode change is needed (step 202) and initiates reconfiguration of the programmable logic. A mode change is determined to be needed, for example, when a Java application exits and translation is no longer needed, and a different application that requires support processing begins executing. In an example embodiment, a special instruction signals the mode to which to change the computing arrangement, and the instruction processing logic specifies the configuration bitstream 122 or 124 to be loaded into the programmable logic. The specification may be accomplished with either an index or an address.

To initiate the mode change, the control software suspends the application in execution by the VLIW logic (step 204) and selects the operating mode (step 206). Each operating mode has an associated configuration bitstream, which is used to configure the programmable logic (step 208). After reconfiguration of the programmable logic is complete, the execution of the application is resumed (step 210). The VLIW logic continues application execution until another mode change is needed.

Figure 3:
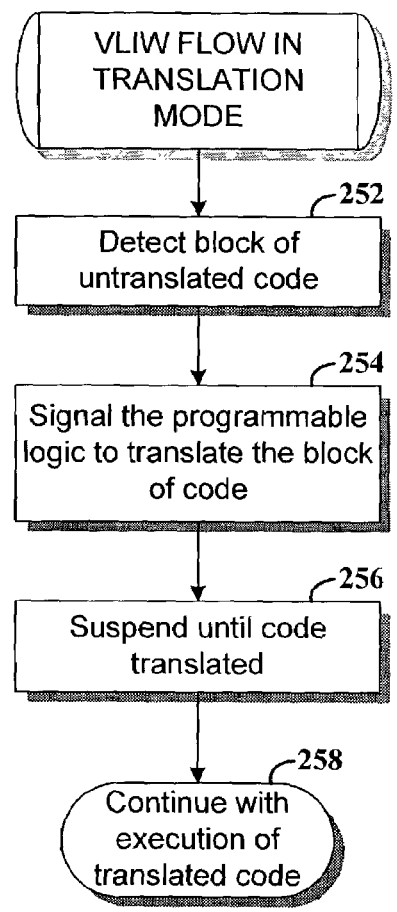
FIG. 3 is a flowchart of an example process performed by the VLIW logic while operating in a code translation mode.

FIG. 3 is a flowchart of an example process performed by the VLIW logic while the computing arrangement is operating in a translation/translation-cache management (compatibility) mode. While the computing arrangement is in the compatibility mode, the VLIW logic signals the programmable logic to translate designated code sequences. In the case of the JVM, the VLIW logic executes the JVM, and the JVM detects a block of code to translate (step 252). The code being executed by the VLIW logic detects blocks of un-translated code (step 252). The types of blocks that would typically be translated are loops and subroutines.

When an un-translated block of code is detected, and the VLIW logic determines (for example, by counting the number of times the block is executed) that it would beneficial to translate the block to native instructions, the VLIW signals the programmable logic to translate the block of code (step 254). The VLIW logic indicates to the programmable logic the address of the block along with the length of the block. The VLIW logic then suspends until the block is translated (step 256). Once the block is translated, the programmable logic signals the VLIW logic and indicates the address of the translation set in the translation cache. The VLIW logic continues execution at the instruction address provided by the programmable logic (step 258).

Figure 4:
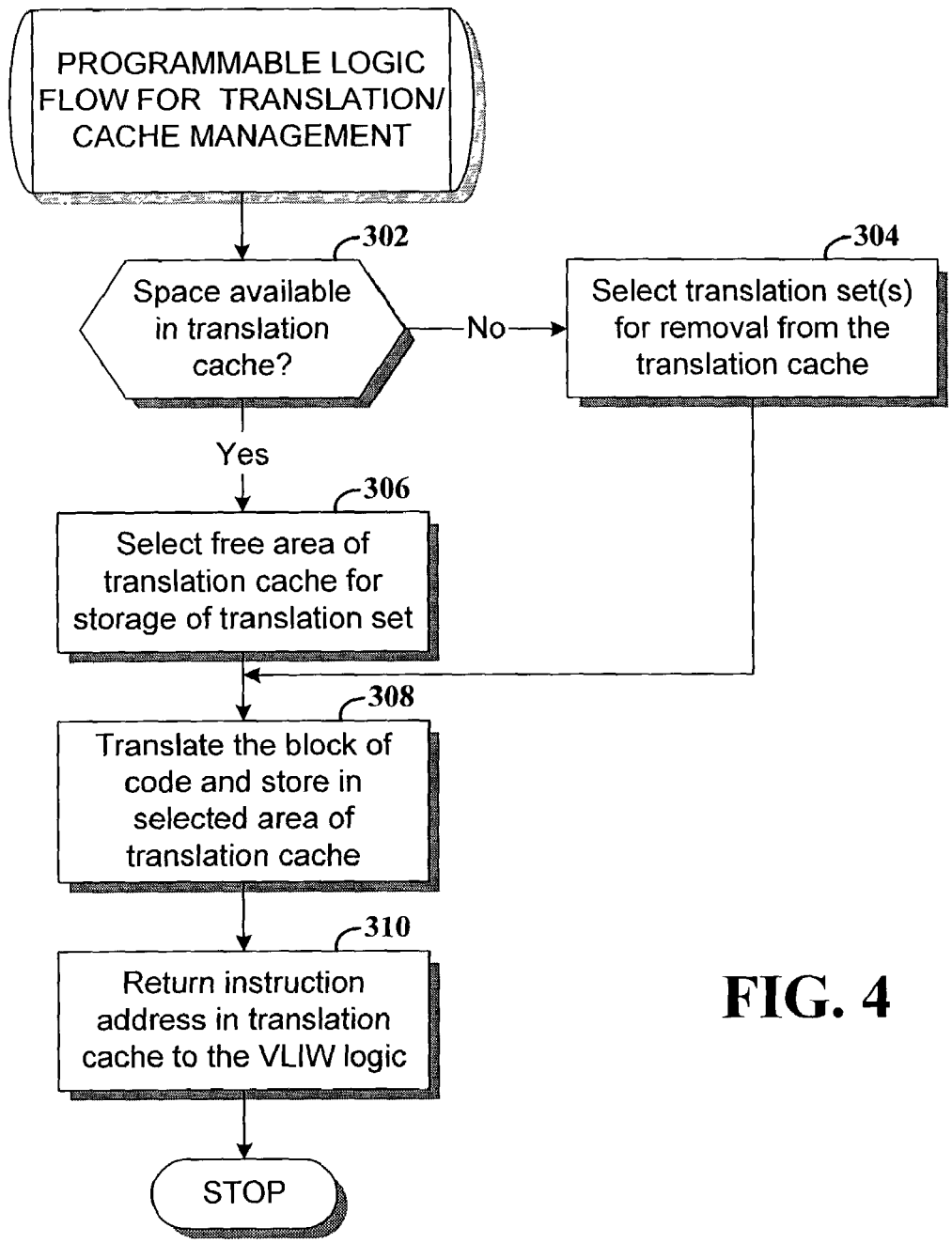
FIG. 4 is a flowchart of an example process performed by the programmable logic while operating in a code translation and cache management mode.

FIG. 4 is a flowchart of an example process performed by the programmable logic while operating in the translation/translation cache management mode. The process generally follows the same process used when the translation and translation cache management functions are performed by a processor. However, the programmable logic offloads the translation and translation cache management processing from the processor.

In translating a block of code, storage space must be identified for the translation set. If there is no space available in the translation cache (step 302), the programmable logic selects one or more translation sets for removal from the translation cache (step 304). In an example embodiment, the least recently used translation set(s) is selected for replacement. If there is space available in the translation cache, a free area is selected for storage of the new translation set (step 306). The selected block of code is then translated and stored in the selected area of the translation cache (step 308). The starting address of the translation set is provided to the VLIW logic (step 310), which continues execution at that address.

Accordingly, the present invention provides, among other aspects, a method and apparatus for operating a computing arrangement including a processor and programmable logic. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computing arrangement, comprising:
    an instruction processing circuit that executes instructions of a native instruction set;
    a memory arrangement coupled to the instruction processing circuit; and
    a programmable logic circuit coupled to the instruction processing circuit and to the memory arrangement, the programmable logic being reconfigurable for switching between operating, in a first mode to dynamically translate input instructions to translated instructions of the native instruction set, manage cache storage of the translated instructions in the memory arrangement, and provide the translated instructions to the instruction processing circuit for execution, and operating in a second mode to perform a function for an application program running on the instruction processing circuit;
    wherein the programmable logic circuit operating in the first and second modes offloads processing of first mode and second mode operations from the instruction processing circuit while the instruction processing circuit is executing an application program.

2. The computing arrangement of claim 1, further comprising:
    wherein the memory arrangement is configured with an application program that is executable by the instruction processing circuit;
    wherein the instruction processing circuit is configured to selectively reconfigure the programmable logic circuit between a first set of configuration data for operating in the first mode and a second set of configuration data for operating in the second mode.

3. The computing arrangement of claim 1, further comprising a cache coupled to the instruction processing circuit and configured for cache storage of native instructions for execution by the instruction processing circuit.

4. The computing arrangement of claim 1, wherein the input instructions are members of an instruction set other than the native instruction set.

5. The computing arrangement of claim 4, wherein the input instructions are members of a platform-independent instruction set.

6. The computing arrangement of claim 1, wherein the instruction processing circuit and the programmable logic are integrated on one chip.

7. The computing arrangement of claim 1, wherein the instruction processing circuit and the programmable logic are integrated on separate chips.

8. The computing arrangement of claim 1, wherein the programmable logic circuit is a field programmable gate array.

9. A method of operating a computing arrangement including an instruction processing circuit coupled to a programmable logic circuit, and a memory arrangement coupled to the instruction processing circuit and to the programmable logic circuit, comprising:
    executing by the instruction processing circuit a first program containing instructions of a native instruction set;
    configuring the programmable logic circuit under control of the instruction processing circuit with a first configuration bitstream stored in the memory arrangement; and
    dynamically translating input instructions to translated instructions of the native instruction set by the programmable logic circuit as configured with the first configuration bitstream;
    storing the translated instructions in a translation cache in the memory arrangement;
    providing the translated instructions to the instruction processing circuit for execution; and
    configuring the programmable logic circuit with a second configuration bitstream such that said programmable logic circuit operates to assist a program running on the instruction processing circuit;
    wherein the programmable logic circuit configured with the first and second configuration bitstreams offloads processing of first mode and second mode operations from the instruction processing circuit while the instruction processing circuit is executing a program.

10. The method of claim 9, further comprising:
    executing by the instruction processing circuit a second program containing instructions of the native instruction set;
    selectively reconfiguring the programmable logic circuit with the second configuration bitstream; and
    processing data by the programmable logic circuit under control of the second program being executed by the instruction processing circuit.

11. The method of claim 9, wherein the computing arrangement further comprises a first-level cache coupled to the instruction processing circuit, the method further comprising caching native instructions in the first-level cache for execution by the instruction processing circuit.

12. The method of claim 9, wherein the input instructions are members of an instruction set other than the native instruction set.

13. The method of claim 12, wherein the input instructions are members of a platform independent instruction set.

14. The method of claim 9, wherein the programmable logic is a field programmable gate array.

15. A computing arrangement, comprising:
   an instruction processing circuit that executes instructions of a native instruction set and which controls a programmable logic circuit that is reconfigurable to operate in either a first mode or a second mode;
   a memory arrangement, including a cache memory device; and
   a hardware unit including said programmable logic circuit coupled to said instruction processing circuit and said memory arrangement,
   wherein said programmable logic unit operates (1) in said first mode to translate instructions from a programming language into said native instruction set and forward said translated instructions to said instruction processing circuit, and
   (2) in said second mode to assist an application being run by said instruction processing circuit;
   wherein the programmable logic circuit operating in the first and second modes offloads processing of first mode and second mode operations from the instruction processing circuit while the instruction processing circuit is executing an application.

16. The arrangement of claim 15, wherein said second mode to assist an application being run by said computing arrangement can be one of data encryption, data decompression, speech recognition, or image rendering.

17. The arrangement of claim 15, wherein said first mode includes managing said memory cache device.

* * * * *